Sept. 7, 1965

R. W. BUTSCH 3,204,285

ANTI-FOULING CASTER

Filed Jan. 8, 1964

INVENTOR.
RICHARD W. BUTSCH
BY
Lockwood, Woodard, Smith & Weikart
Attorneys

Sept. 7, 1965    R. W. BUTSCH    3,204,285
ANTI-FOULING CASTER

Filed Jan. 8, 1964    3 Sheets-Sheet 2

INVENTOR.
RICHARD W. BUTSCH
BY
Lockwood, Woodard, Smith & Weikart
Attorneys

Sept. 7, 1965 R. W. BUTSCH 3,204,285
ANTI-FOULING CASTER
Filed Jan. 8, 1964 3 Sheets-Sheet 3

INVENTOR.
RICHARD W. BUTSCH
BY
Lockwood, Woodard, Smith & Weikart
Attorneys

United States Patent Office 3,204,285
Patented Sept. 7, 1965

3,204,285
ANTI-FOULING CASTER
Richard W. Butsch, Evansville, Ind., assignor, by mesne assignments, to Bliss & Laughlin, Incorporated, Oak Brook, Ill., a corporation of Delaware
Filed Jan. 8, 1964, Ser. No. 336,428
9 Claims. (Cl. 16—40)

This invention relates generally to casters and more particularly to a caster particularly well suited to use in conditions where conventional caster assemblies pick up foreign matter and become clogged and inoperative.

This application is a continuation-in-part of my copending application, Serial No. 159,619, filed December 15, 1961, entitled Anti-Fouling Caster, and assigned to the Faultless Caster Corporation.

The textile industry operates many caster equipped hand trucks. The conditions in cotton mills in particular are such that conventional casters become clogged with lint and threads that inhibit their free operation. Various attempts have been made to alleviate the problem of threads which are picked up by the wheels and wrapped around the wheel axle. Devices resulting from such attempts have had very limited success, and some are of quite questionable advantage inasmuch as they contribute to faster build-up of thread and lint.

In textile mills, maintenance of casters is difficult and expensive. Not only has there been a need for casters requiring less maintenance, but for casters which, when they do require maintenance, can be easily serviced. This is true for casters used in certain other industries as well as in the textile industry. One example would be the shoe industry with its leather scrap problem.

It is, therefore, a general object of the present invention to provide an improved caster.

It is a further object of this invention to provide a caster which can be successfully operated on a dirty environment or an environment where it is subjected to lint, ravelings, thread, and other foreign matter.

It is a further object of this invention to provide a caster which can be operated in such environments without becoming fouled or inoperative by the foreign matter present in the environnent.

It is a further object of this invention to provide a caster adequate to achieve the foregoing objects and which is easily maintained.

Described briefly, a typical embodiment of the present invention includes a frame which is formed to minimize the area where lint can collect between the wheel and the frame. It may also include an adjustable and flexible scraping device to prevent build-up of lint on the periphery of the wheel. Moreover, it incorporates a unitized wheel and axle assembly which can be readily removed from or attached to the frame.

The full nature of the invention will be understood from the accompanying drawings and the following description and claims.

Figure 1:
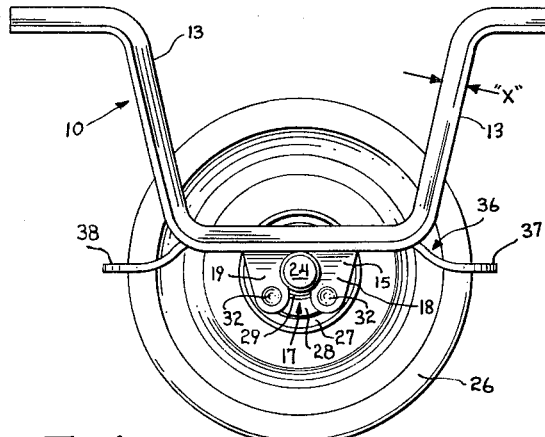
FIG. 1 is a side elevation of a typical embodiment of the present invention.

Referring to the first four figures of drawing, frame 10 is an integral unit of parallel front 11 and rear 12 cross members maintaining the generally U-shaped side members 13 and 14 in parallel spaced relation. The frame may, for example, be stamped from a blank of cold rolled steel sheet having a thickness of .095 inch. A wing or projection 15, integral with the side member 13 extends from the inner edge 16 thereof inwardly and then downwardly parallel to edge 16 and has a cut-out 17 therein to provide a yoke between the forward 18 and rear 19 portions of the wing. An identical wing projects inwardly and downwardly from the inner edge of the side member 14, in a plane parallel to the inner edge thereof and parallel to that of projection 15.

Figure 2:
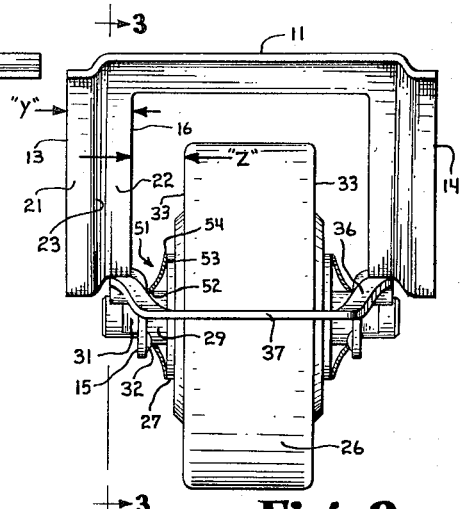
FIG. 2 is a front elevation thereof.
Figure 3:
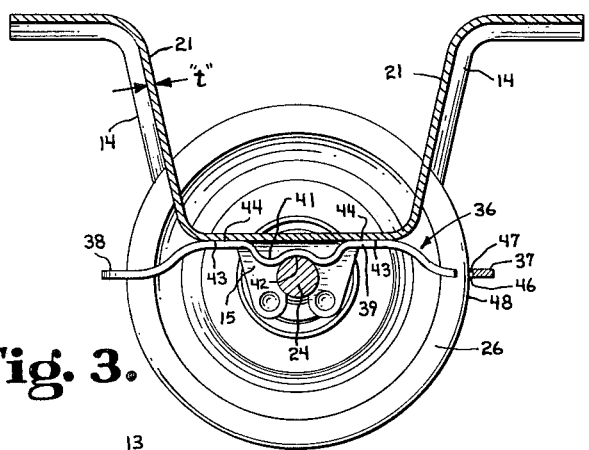
FIG. 3 is a section taken along the lines 3—3 of FIG. 2 and viewed in the direction of the arrows, with a portion of the scraper being broken away and further sectioned to illustrate the relationship thereof to the wheel.
Figure 4:
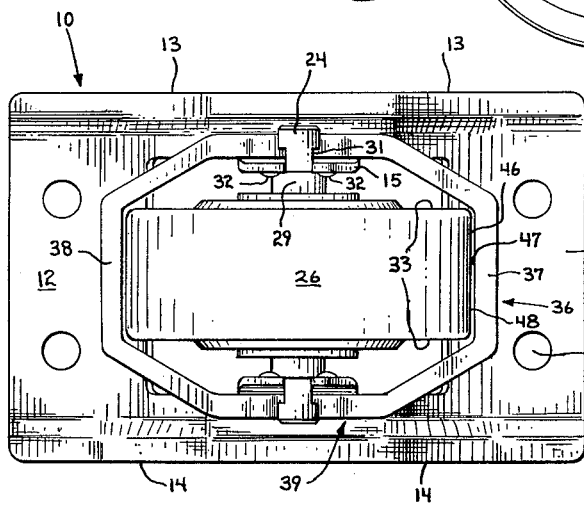
FIG. 4 is a bottom plan view of the typical embodiment.

As can be appreciated from FIG. 2, the side members of the frame are so formed that the outer portion 21 and inner portion 22 thereof are offset from each other by the intermediate portion 23. In this manner, the strength necessary to sustain longitudinal loads and vertical loads on the caster is achieved while the thickness of the side member inner edge 16 (FIG. 2) facing the wheel is extremely small, .095 inch, for example. Even the projected thickness "X" (FIG. 1) of the members, transverse to the axle 24, is only approximately half the thickness "Y" (FIG. 2) in the direction parallel to the axle 24. Thus, the great majority of the entire mass of the side members is in planar sheet form perpendicular to the sides of the wheel, and parallel to the axle.

A wheel 26 is mounted to the axle 24 through the ball bearing assemblies including outer race 27 and inner race 28 with balls (not shown) disposed therebetween. A spacer 29 disposed around the axle 24, abuttingly engages the inner race 28 and the wing 14. As one example of an alternative construction, the spacer could be eliminated and the axle could be formed with a stepped outside diameter. In the embodiment of FIGS. 1–4, wheel, axle, and spacer assembly are mounted on the frame by virtue of the slots or grooves 31 in the axle. The slotted portion of the axle is received in the cut-out 17, and because of this arrangement the axle cannot turn in the frame. In this manner, wear which might otherwise occur is avoided. The assembly is retained in the cut-out 17 by means of the bosses 32 engaging the spacers 29. By variation of the size of the bosses, variation can be achieved in the amount of force required to either remove or replace the wheel and axle assembly in the frame.

It will be observed particularly by reference to FIG. 2 that a substantial space "Z" is provided between the inner edge 16 of the side members and the sides 33 of the wheel. By virtue of this great space and the small area of the inside edge 16 facing the wheel side 33, which can be appreciated by reference to FIG. 3, lint will not accumulate between the frame and the wheels to impede rotation of the wheel. Thus, with the caster including the structure thus far described, lint cannot normally become a problem nor can reasonable amounts of other foreign matter. This includes threads and ravelings as well as miscellaneous other types of foreign matter.

As a further precaution against fouling, particularly where the caster is to be operated in areas of high concentration of foreign matter, a novel scraper 36 can be provided according to the present invention. The scraper may be formed of a single piece of cold rolled steel, for example, and includes a front 37 and a rear 38 transverse members carried by generally longitudinal members 39 (FIG. 3) secured to the frame. As evident in FIG. 4, a typical scraper has a generally octagonal configuration. While the scraper could be secured to the frame by welds, screws, or other fasteners, a preferred securing is shown wherein a generally W-shaped portion 41 (FIG. 3) having the central region 42 is provided on the scraper, the central region being engaged by the axle 24 and the upper faces at the extremities 43 thereof being engaged by the underside 44 of the inner portions 22 (FIG. 2) of the frame side members. With this construction, the scraper can be incorporated in the caster by snap-on action. The space 46 (FIG. 3) between the inner edge 47 of the scraper and the periphery 48 of the wheel can be varied according to operating conditions to obtain best performance, by bending the scraper about an axis parallel to the axle of the wheel.

As a further precaution against entanglement or raveling of thread about the axle, a washer-like circular seal 51 (shown in diametral section in FIG. 2 only) may be provided. The seal may be of a flexible rubber-like material if desired and is provided with an opening 52 which is normally slightly smaller than the outside diameter of the spacer, or axle where the separate spacer is omitted. The seal is normally pushed on over the spacer and the face 53 thereof adjacent the outer marginal edge 54 of the seal is secured to the outer race 27 by an adhesive such as rubber cement so that the seal rotates with the wheel.

Figure 5:
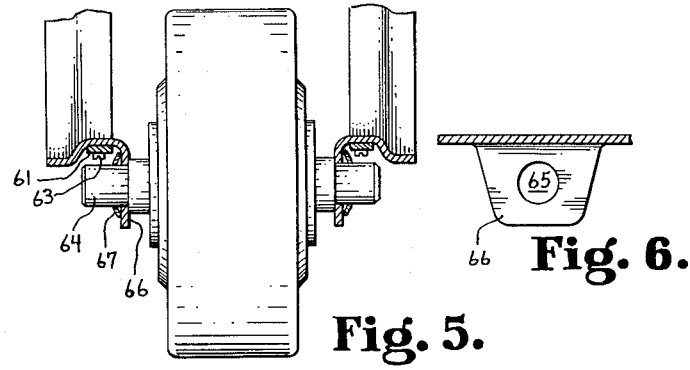
FIG. 5 is a transverse section of a second embodiment of the present invention, taken along the axis of the axle and illustrating a variation of the mounting of the axle to the frame of the caster.
Figure 6:
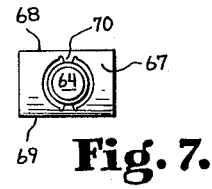
FIG. 6 is a fragmentary side elevation of a portion of the frame of the embodiment of FIG. 5.
Figure 7:
FIG. 7 is a side elevation of the axle of FIG. 5 with a metal retaining clip mounted thereon.

Referring to FIGS. 5, 6, and 7, an alternative construction is shown. The scraper 61 is mounted to the frame 62 by means of screws 63. The axle 64 passes through the apertures 65 in the wing 66. It is secured in place by means of the spring clip 67, the upper and lower edges 68 and 69, respectively, engaging the outside face of the wing 66, the projections 70 and 71 engaging the outside diameter of the axle.

Figure 8:
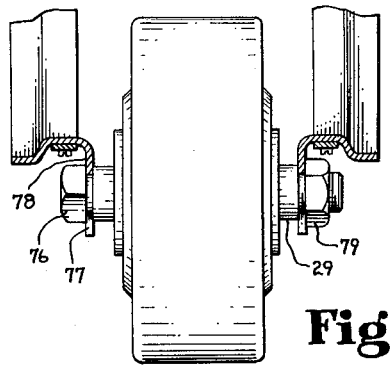
FIG. 8 is a section through a third embodiment of the invention taken along a plane through the axle and illustrating a third means of mounting the wheel to the frame.
Figure 9:
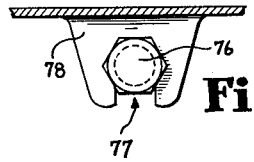
FIG. 9 is a fragmentary side elevation of the embodiment of FIG. 8.

Referring to FIG. 8, a bolt 76 is used as an axle. It is received in the slot 77 in the wing 78. The wing 78 is much the same as that shown in the first four figures, but the bosses 32 (FIG. 2) are not necessary in view of the fact that the nut 79 secures the wheel and axle assembly to the frame.

Figure 10:
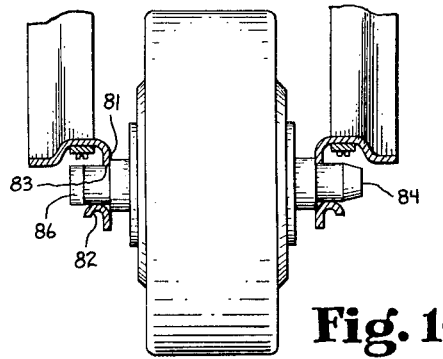
FIG. 10 is a section through a fourth embodiment of the present invention taken along a plane through the axle, illustrating a still further means of mounting the wheel to the frame.
Figure 11:
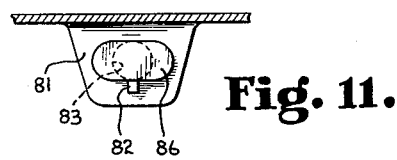
FIG. 11 is a fragmentary side elevation of a portion of a frame with the axle of FIG. 10 installed.

Referring to FIGS. 10 and 11, a still further variation is shown. The wings 81 are provided with tabs 82 adjacent an aperture 83 therethrough. An axle 84 having the "T" head 86 thereon is inserted in the apertures 83 and secured by the spring action of the tabs against the outside diameter of the axle.

Figure 12:
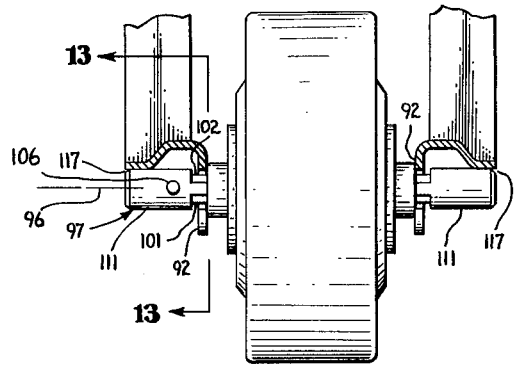
FIG. 12 is a section through a fifth embodiment of the present invention taken along a plane through the axle, illustrating a still further means of mounting the wheel to the frame.
Figure 13:
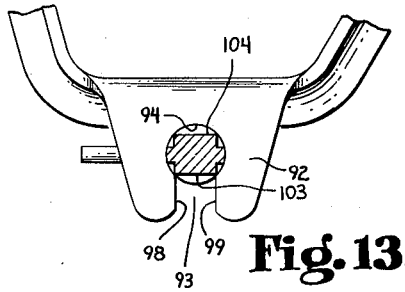
FIG. 13 is a fragmentary section (enlarged) through the embodiment of FIG. 12 and taken along the line 13—13 and viewed in the direction of the arrows.
Figure 14:
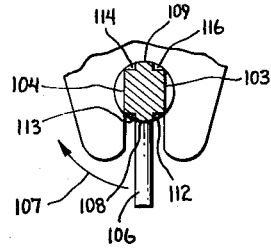
FIG. 14 is a fragmentary section (enlarged) similar to FIG. 13 but illustrating the axle turned 90° in order to facilitate removal and installation thereof.

Referring to the embodiment shown in FIGS. 12, 13, and 14, the wings 92 on each side of the frame have the downwardly opening slots 93, providing a yoke at each side of the wheel. The upper portion of the yokes is circular as shown at 94, the center of the circular portion being colinear with the axis 96 of the axle 97. The diameter of the circular portion is greater than the width of the straight-sided portion of the slot between the slot sides 98 and 99.

The axle is provided with a pair of slots or grooves 101 and 102 at each side of the wheel and the flat surfaces 103 and 104 at the bottom of the grooves are spaced to fit between the flat edges 99 and 98 of the slot 93 in the wing 92 when the axle is disposed as shown in FIG. 14. This accommodates insertion of the axle into the circular portion of the yokes and removal therefrom, when desired.

To retain the axle is the circular portion of the yokes, it is necessary only to turn the handle pin 106 in the direction of the arrow 107 in FIG. 14 so it is disposed as shown in FIG. 13. Then the axle slots are transverse to the direction of the straight sides of the yoke entrance. The portions 108 and 109 of the axle, which are merely the unslotted portions of the cylindrical surface 111 of the axle, have a slight interference fit with the circular margin of the circular portion 94 of the yokes 93, the axle diameter being slightly greater than the diameter of the circular portion 94. They are thereby effective to securely retain the axle in the yokes and to prevent accidental rotation of the axle during rotation of the wheel in the use of the caster.

If desired, relief grooves 112, 113, 114, and 116 can be provided in the surfaces 108 and 109 to reduce the total amount of effort required to rotate the handle pins 106 for locking or releasing the axle upon installation or removal of the axle.

In this fifth embodiment of the invention, the outer end portions of the axle are positioned such that they can engage and support the frame at the points 117 as an alternative to or supplementing the support provided by the axle portions in the wings 92.

Figure 15:
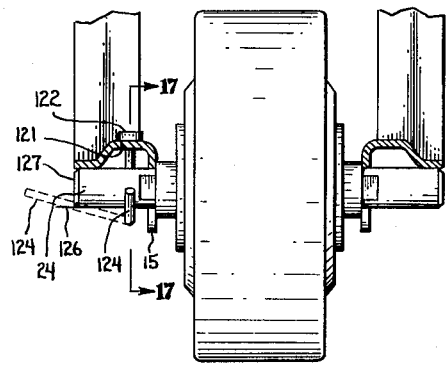
FIG. 15 is a section through a sixth embodiment of the present invention taken along a plane through the axle, illustrating a still further means of mounting the wheel to the frame.
Figure 16:
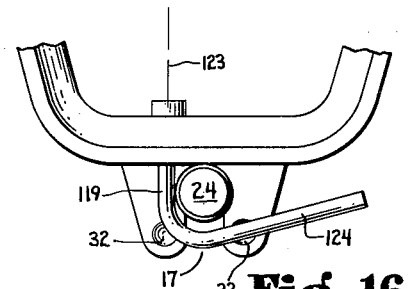
FIG. 16 is a fragmentary side elevation of a portion of the embodiment of FIG. 15 (enlarged).
Figure 17:
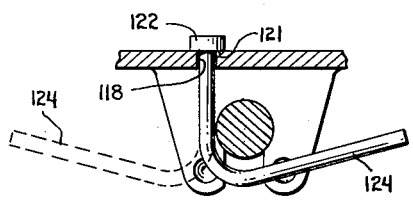
FIG. 17 is a fragmentary section through the embodiment of FIG. 15 taken along the line 17—17 and viewed in the direction of the arrows, and showing an axle retaining wire in the axle retaining position by the solid outlines, and in the position accommodating removal of the axle by the dotted outline, this being an enlarged section.

Referring now to the sixth embodiment shown in FIGS. 15, 16, and 17, the frame wings 15 and axle 24 may be the same as shown in FIGS. 1 through 4, if desired, and they are, therefore, assigned the same reference numerals. However, an aperture 118 is provided in the frame side member at each side of the wheel and adjacent the wings.

A generally V-shaped retainer member 119 is received in each aperture 118 and is supported by the frame side member engaging the underside 121 of the head 122 of the retainer member. This retainer member is rotatable in the aperture 118 on the vertical axis 123 between the retaining position shown by the solid outlines and the release position shown by the dotted outline in FIG. 17.

When in the position shown by the solid outline, one leg 124 of the retainer member passes under the axle adjacent the downwardly opening slot 17 in the wings. It thereby crosses the path in which the axle 24 must move to depart from the yoke and thereby prevents the axle from falling out of the yoke. With such a retainer member on each side of the wheel, bosses 32 in the lower ends of the wings can be eliminated if desired.

The outer end of leg 124 of the retainer member extends well above the level 126 of the lowermost part of the axle which is outward of the retainer member. It extends high enough, and the outer end 127 of the axle extends far enough out from the axis 123 of the retainer member, that when the retainer member is rotated on the axis 123, it cannot be moved from the retaining position to the release position shown in the dotted outline in FIG. 17 without interfering with a portion of the axle. The extent of interference is indicated by the dotted outline in FIG. 15 which represents the leg 124 of the retainer member turned through 90° on the axis 123. However, the retainer member is usually made of a wire or a material having some resiliency so that it can be forceably and resiliently deformed sufficiently to pass the end of the axle when it is desired to move it to the release position shown by the dotted outline in FIG. 17. The length of the leg 124 is made great enough that there is a sufficient lever arm with respect to the rotational axis 123 thereof to facilitate moving the wire to the release position without the use of tools, if desired.

When the retainer member is in the axle retaining position, it positively prevents accidental disengagement of the axle from the frame, even though the caster may be operated under severe impact conditions.

It should be noted at this point that the frame 10 may be secured by bolts or other fasteners through the holes 91 therein to the underside of a hand truck or other device to be borne by the casters. Also, it may be mounted to a pivot assembly if desired to obtain swiveling caster action.

By virtue of the unique frame construction of the present invention with the generous clearances provided, accumulation of foreign matter is prevented between wheel sides and the frame. The unique axle with unitized wheel and seal assembly enables simple, easy removal of the assembly from the frame to clean or remove any lint or thread which might have accumulated over a long period of time. The unique flexible and adjustable scraper device clears foreign matter from the wheel as it rotates and by virtue of the snap-on feature, can easily be added to or removed from the frame and wheel assembly as desired.

The seal is not only quite simple but is also well suited to prevent dirt or other foreign matter from entering the bearings of the wheel and also is adapted to prevent accumulation of windings around the axle and frame. By virtue of the minimum of clearance provided between the cut-out in the frame wings and the slot in the axle, turning of the axle is prevented under all circumstances. Also, the provisions of the embossments 32 according to the invention, provides a simple means whereby the effort required to install or remove a wheel can be varied by simply varying the size of the embossments.

In addition to the benefits derived from the typical embodiment shown and described, other variations may in certain instances prove desirable. Cost, manufacturing, and maintenance considerations have considerable significance in the selection of which variation might prove desirable in a given set of circumstances.

While the invention has been disclosed and described in some detail in the drawings and foregoing description, they are to be considered as illustrative and not restrictive, in character, as other modifications may readily suggest themselves to persons skilled in this art and within the broad scope of the invention, reference being had to the appended claims.

I claim:
1. A caster comprising:
   a wheel;
   an axle mounted to said wheel;
   a frame, said frame having a pair of side members mounted on said axle, the said side members of said frame being formed of sheet material of uniform thickness with each side member having an inner edge having a width equal to the sheet thickness, said inner edge being the only portion of said side member facing a side of said wheel and said edge being disposed a substantial distance from the side of said wheel to prevent entanglement with said frame of foreign matter picked up by said wheel, all portions of said side members other than said edges being more remote from the side of said wheel than said inner edges, and each side member having an outer edge located a distance from its said inner edge, which distance when measured in a direction parallel to said axle is substantially greater than the thickness of said sheet material; and
   projections depending from each of said side members, each projection being formed of said sheet material and therefore having a thickness equal to said sheet thickness and having means thereon retaining said axle.

2. A caster comprising:
   a wheel;
   an axle mounted to said wheel;
   a frame, said frame having a pair of side members mounted on said axle, each of said side members having a generally U-shaped appearance when viewed in a direction parallel to said axle and having an outer portion and an inner portion, said inner portion being offset from said outer portion by an intermediate portion integral with said outer and inner portions, the said side members of said frame being formed of sheet material with each side member having an edge having a width equal to the sheet thickness, said edge being the only portion of said side member facing a side of said wheel and said edge being disposed a substantial distance from the side of said wheel to prevent entanglement with said frame of foreign matter picked up by said wheel, all portions of said side members other than said edges being more remote from the sides of said wheel than said edges; and
   projections depending from each of said side members and having means thereon retaining said axle.

3. A caster comprising:
   a wheel and bearing assembly;
   an axle mounted to said wheel and bearing assembly and having a slotted portion adjacent an end of said axle;
   a spacer encircling said axle at each side of said wheel and having a smooth round external surface coaxial with said axle;
   a frame, said frame having a pair of side members mounted on said axle, said side members having a generally U-shaped appearance when viewed in a direction parallel to said axle, the majority of the mass of said side members lying parallel to said axle, the side members of said frame being formed of sheet material with an edge having a width equal to the sheet thickness, said edge facing said wheel and disposed a substantial distance from the sides of said wheel to prevent entanglement with said frame of foreign matter picked up by said wheel; and
   projections depending from each of said side members and forming a yoke depending from each of said side members, one of said yokes being disposed at each side of said wheel with one of said spacers being disposed between an inside face of said projections and an outside face of said wheel and bearing assembly, at least one of said yokes receiving the slotted portion of said axle to prevent relative rotation therebetween, said projections having spherical surfaced bosses thereon retaining said spacers and thereby retaining said axle portion in said yoke; and
   a flexible seal secured to each side of said wheel and having an opening therein embracing one of said spacers, whereby said seals are sealed to said *spacers*, and said seals are rotatable in unison with said wheel with respect to said axle, the combination of said wheel and bearing assembly with said axle and spacers and seal comprising a wheel and axle assembly retained in said frame by said bosses and readily removable from said frame.

4. A caster comprising:
a wheel;
an axle mounted to said wheel;
a frame, said frame having a pair of side members mounted on said axle, each of said side members having a generally U-shape when viewed in a direction parallel to said axle and having an outer portion and an inner portion, said inner portion being offset from said outer portion by an intermediate portion integral with said outer and inner portions;
projections depending from the said inner portions and providing a yoke at each side of said wheel and receiving said axle;
a retainer member mounted to one of said side members and having a leg which, when said retainer member is in an axle retaining position, extends across the path of departure of said axle from the one yoke formed by the projections depending from said one side member, to retain said axle in said one yoke, said retainer member being pivotally mounted to said one side member and thereby movable to a second position releasing said axle, said leg and said axle being disposed for interference between said leg and axle during movement of said leg from said retaining position to said releasing position.

5. A caster comprising:
a wheel;
an axle mounted to said wheel;
a frame, said frame having a pair of side members mounted on said axle;
projection means depending from one of said side members and forming a yoke at one side of said wheel, said yoke receiving a portion of said axle;
and retainer means having a retaining portion disposed in a first position retaining said axle portion in said yoke, said retainer means being pivotally mounted to said one side member whereby said retaining portion is swingable to a second position accommodating removal of said axle portion from said yoke;
said yoke having a pair of side margins extending in a first direction, and the direction of extension of the pivotal axis of said retainer means being parallel to said first direction.

6. A caster comprising:
a wheel;
an axle mounted to said wheel;
a frame, said frame having a pair of side members mounted on said axle;
projection means depending from one of said side members and forming a yoke at one side of said wheel, said yoke receiving a portion of said axle;
and retainer means having a retaining portion disposed in a first position retaining said axle portion in said yoke, said retainer means being pivotally mounted to said one side member whereby said retaining portion is swingable to a second position accommodating removal of said axle portion from said yoke;
said axle lying in the path of swinging movement of said retaining portion between said first position and said second position to interfere with movement of said retaining portion from said first position to said second position.

7. The caster of claim 6 wherein said retaining means is resiliently deformable to an attitude clearing said axle at a position between said first and second position.

8. A caster comprising:
a frame having a pair of side members;
a wheel having a portion disposed between said side members;
projections on said frame side members and affixed thereto and forming a pair of yokes in horizontally spaced relation, said yokes opening generally downwardly;
an axle mounted to said wheel and having slotted portions received by said yokes whereby said yokes prevent rotation of said axle;
spacer means mounted on said axle and coaxial therewith and completely encircling said axle and having faces abuttingly engageable with said projections, said wheel being rotatable independent of said spacer means, and each of said projections having front and rear portions and having protruding bosses thereon with the bosses being located under said spacer means, said bosses thereby being disposed to physically interfere with said spacer means and resist removal of said spacer means and thereby retain said axle in said yoke.

9. The caster of claim 8 wherein said bosses protrude from said projections in a direction parallel to said axle.

References Cited by the Examiner

UNITED STATES PATENTS

| | | | |
|---|---|---|---|
| 516,502 | 3/94 | Mauermann | 301—5.3 |
| 750,799 | 2/04 | Bornemann | 16—31 |
| 951,553 | 3/10 | Williams et al. | 16—41 |
| 988,533 | 4/11 | Zverina | 280—11.23 |
| 1,540,508 | 6/25 | White | 301—112 |
| 1,703,936 | 3/29 | Jervoise | 280—11.23 |
| 1,864,933 | 6/32 | Pynynski | 16—18 |
| 1,900,672 | 3/33 | Uhl | 16—18 |
| 2,255,113 | 9/41 | Greefleaf | 16—41 |
| 2,509,824 | 5/50 | Johnson | 280—47.32 X |
| 2,615,193 | 10/52 | Klijberg | 16—45 X |
| 2,615,759 | 10/52 | Becker | 301—112 |
| 2,837,376 | 6/58 | Bruno | 301—37 |

FOREIGN PATENTS

| | | |
|---|---|---|
| 9,775 | 1890 | Great Britain. |
| 520,958 | 1/56 | Canada. |

ARTHUR L. LA POINT, *Primary Examiner.*

DONLEY J. STOCKING, *Examiner.*